(12) United States Patent
Hou et al.

(10) Patent No.: US 12,553,111 B2
(45) Date of Patent: *Feb. 17, 2026

(54) FORMED ARTICLE HAVING LOW STRETCHING ANISOTROPY, FORMING METHOD, AND FORMING POWDER THEREFOR

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Huipeng Hou, Shanghai (CN); Liming Lei, Shanghai (CN); Yanli He, Shanghai (CN); Jun Fu, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD, Shanghai (CN)

( * ) Notice: Subject to any disclaimer, the term of this patent is extended or adjusted under 35 U.S.C. 154(b) by 503 days.

This patent is subject to a terminal disclaimer.

(21) Appl. No.: 18/001,530

(22) PCT Filed: Oct. 21, 2021

(86) PCT No.: PCT/CN2021/125366
§ 371 (c)(1),
(2) Date: Dec. 12, 2022

(87) PCT Pub. No.: WO2022/105528
PCT Pub. Date: May 27, 2022

(65) Prior Publication Data
US 2023/0243021 A1 Aug. 3, 2023

(30) Foreign Application Priority Data
Nov. 19, 2020 (CN) .......................... 202011297579.4

(51) Int. Cl.
*C22C 19/05* (2006.01)
*B33Y 10/00* (2015.01)
*B33Y 70/00* (2020.01)

(52) U.S. Cl.
CPC ............ *C22C 19/055* (2013.01); *B33Y 10/00* (2014.12); *B33Y 70/00* (2014.12)

(58) Field of Classification Search
CPC ... C22C 19/055; C22C 1/0433; C22C 19/056; C22C 19/057; C22F 1/10; B33Y 10/00; B33Y 70/00
See application file for complete search history.

(56) References Cited

U.S. PATENT DOCUMENTS

2018/0347013 A1  12/2018  Szuromi et al.

FOREIGN PATENT DOCUMENTS

| CN | 106513660 A | 3/2017 | |
|---|---|---|---|
| CN | 108555296 A | 9/2018 | |
| CN | 110918992 A | 3/2020 | |
| EP | 3120953 A1 * | 1/2017 | ............. B22F 10/20 |
| EP | 3293276 A1 | 3/2018 | |

OTHER PUBLICATIONS

International Search Report issued on Dec. 29, 2021, in corresponding International Application No. PCT/CN2021/125366; 5 pages.
Written Opinion issued on Dec. 29, 2021, in corresponding International Application No. PCT/CN2021/125366; 5 pages.

* cited by examiner

Primary Examiner — Jessee R Roe
(74) Attorney, Agent, or Firm — Maier & Maier, PLLC

(57) ABSTRACT

A forming powder for a forming part with a low tensile anisotropy by additive manufacturing, which can be used for forming the forming part with low tensile anisotropy, a method for forming a forming part with a low tensile anisotropy, and a forming part with a low tensile anisotropy. The forming powder for the forming part with low tensile anisotropy by additive manufacturing includes the following chemical components in terms of mass percentage (wt-%): 0.03%≤C≤0.09%, 20.50%≤Cr≤23.00%, 0.50%≤Co≤2.50%, 8.00%≤Mo≤10.00%, 0.20%≤W≤1.00%, 17.00%≤Fe≤20.00%, 0%<B<0.001%, 0%≤Mn≤1.00%, 0%≤Si≤0.15%, 0%≤O≤0.02%, 0%≤N≤0.015%, the rest are Ni and inevitable impurities.

6 Claims, 3 Drawing Sheets

FORMED ARTICLE HAVING LOW STRETCHING ANISOTROPY, FORMING METHOD, AND FORMING POWDER THEREFOR

TECHNICAL FIELD

The invention relates to field of additive manufacturing, in particular to a forming part with a low tensile anisotropy, forming method and its forming powder.

BACKGROUND

Nickel-based superalloys are widely used in the field of aerospace, the main alloying compositions of the alloys are Ni, Co, Cr, W, etc., which have strong oxidation resistance and corrosion resistance in a high temperature environment. Additive manufacturing technique is predicted to be one of the key techniques that may trigger the 'third industrial revolution', which has various benefits compared to the conventional processing technique, such as high material utilization, high design freedom, high forming accuracy and good surface quality. According to the different forms of feeding raw materials, additive manufacturing can be separated into two forms, based on powder bed and material synchronous feeding, wherein the main technical principle of powder-bed type additive manufacturing is: the three-dimensional digital model of the part to be processed is separated layer by layer and input into the forming equipment; a forming base plate is fixed on a forming platform and leveled, powder spreading is performed on a single layer by a powder spreading mechanism (generally to be a scraper or a powder roller) with one or more laser/electron beam, selective melting is performed on the single layer powder spreaded to achieve the forming process from a point to a line and from a line to a layer; after one layer is formed, the forming platform gets down to a certain height, and powder spreading and selective melting forming is performed on the next layer to finally achieve the forming process from a layer to a body, so that the final part is obtained, which is especially suitable for high value-added industries such as aerospace.

Due to the additive manufacturing technique, the formation from point to line, from line to layer, and from layer to body is achieved by the movement of molten pool during the forming process. Due to this special process, the microstructure of the forming material in different directions has different features, which in turn leads to anisotropy of mechanical properties. Anisotropy is a significant feature of the additive manufacturing technique.

When the force direction of the part does not have a significant directionality (that is the force direction is isotropic), then the anisotropy of the part material is desired to be as small as possible to avoid the direction where the strength is relative low limits the overall strength and life of the part. Especially, when forming a part that has a complex thin-walled structural in a special shape by additive manufacturing, the part at different position has complex spatial orientation relative to the forming base plate, and the part is often subjected to complex loads under the actual service condition. If anisotropy exists significantly in the part with complex structure, it will lead to an increase in the difference in mechanical properties at different positions of the structural, which in turn will limit the service life and increase the difficulties in part design and verification greatly. Therefore, reducing the anisotropy of mechanical properties of additive manufacturing parts is of great importance for improving the engineering application level of additive manufacturing technique.

Among them, tensile property is one of the most basic and important properties of nickel-based superalloys, and an urgent problem need to be solved is how to reduce the anisotropy of tensile property of the part.

SUMMARY

One objective of the invention is to provide a forming powder for a forming part with a low tensile anisotropy by additive manufacturing, which can be used for forming the forming part with low tensile anisotropy.

Another objective of the invention is to provide a method for forming a forming part with a low tensile anisotropy, which is formed by the above forming powder.

Another objective of the invention is to provide a forming part with a low tensile anisotropy, which is formed by the above forming method.

To achieve one objective mentioned above, the forming powder for the forming part with low tensile anisotropy by additive manufacturing comprises the following chemical components in terms of mass percentage (wt-%):
  $0.03\% \leqslant C \leqslant 0.09\%$, $20.50\% \leqslant Cr \leqslant 23.00\%$, $0.50\% \leqslant Co \leqslant 2.50\%$, $8.00\% \leqslant Mo \leqslant 10.00\%$, $0.20\% \leqslant W \leqslant 1.00\%$, $17.00\% \leqslant Fe \leqslant 20.00\%$, $0\% < B < 0.001\%$, $0\% \leqslant Mn \leqslant 1.00\%$, $0\% \leqslant Si \leqslant 0.15\%$, $0\% \leqslant O \leqslant 0.02\%$, $0\% \leqslant N \leqslant 0.015\%$, the rest are Ni and inevitable impurities.

In one or more embodiments, in terms of mass percentage, the carbon content is: $0.05\% \leqslant C \leqslant 0.09\%$.

In one or more embodiments, in terms of mass percentage, the silicon content is: $0.03\% \leqslant Si \leqslant 0.1\%$.

In one or more embodiments, the forming powder is obtained by gas atomization or rotary electrode atomization.

In one or more embodiments, the powder particle size of the forming powder is from 15 μm to 150 μm.

To achieve another objective mentioned above, the method for forming the forming part with low tensile anisotropy, the forming part with low tensile anisotropy is formed by additive manufacturing process,
  the forming powder used for the additive manufacturing process is the forming powder for the forming part with low tensile anisotropy by additive manufacturing mentioned above.

In one or more embodiments, the additive manufacturing process is a selective laser melting process.

In one or more embodiments, the forming method further comprises:
  performing stress relief annealing treatment on the forming part.

In one or more embodiments, after the stress relief annealing treatment, the forming method further comprises:
  performing wire cutting process on the forming part.

In one or more embodiments, after the wire cutting processing, the forming method further comprises:
  performing hot isostatic pressing process on the forming part.

To achieve another objective mentioned above, the forming part with low tensile anisotropy is formed by the method for forming the forming part with low tensile anisotropy mentioned above.

The invention has one or more of the following improvements:
  the forming powder of the invention is further optimized by the composition content of the chemical elements that play an important role in tensile anisotropy, and in terms of mass percentage, it is determined that 0.03% ≤ C ≤ 0.09%, 0% ≤ Si ≤ 0.15%, 0%<B<0.001%, when the mass percentages of carbon, silicon and baron are controlled to be in the above ranges respectively, the part formed by additive manufacturing with the powder mentioned above has a low tensile anisotropy.

BRIEF DESCRIPTION OF THE DRAWINGS

The specific features and performance of the invention is further described with reference to the following embodiments and drawings.

DETAILED DESCRIPTION

Figure 1:
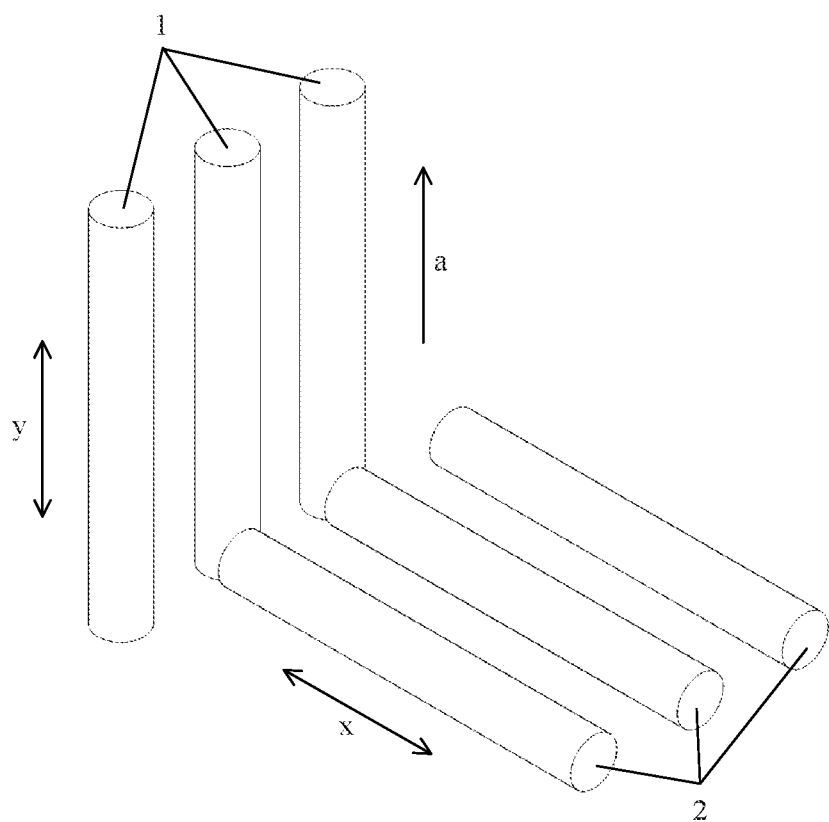
FIG. 1 shows a schematic diagram of the longitudinal specimen and transverse specimen used for the tensile test.

In this disclosure, specific terms are used for describing the embodiments of the invention, such as 'one embodiment', 'an embodiment' and/or 'some embodiments' refers to a certain feature, structure or characteristics related to at least one embodiment of the invention. Therefore, it should be emphasized and noted that 'one embodiment' or 'an embodiment' mentioned two or more times in various places in the description do not necessarily refer to the same embodiment. Furthermore, certain features, structures, or characteristics in one or more embodiments of the invention can be combined as appropriate. In addition, the use of terms such as 'first' and 'second' for defining components is only for the convenience of distinguishing the corresponding components, unless otherwise stated, the above terms do not have special meaning, and therefore cannot be considered as limitations on the scope of protection of the invention.

The effect of the composition of the forming powder on the anisotropic forming properties has been studied in the literature. For example, the anisotropy of Hastelloy-X metal powder in two batches which has a particle size of 15-45 μm are compared by Jing Wei et al. in 'Effect of Hastelloy-X Powder Composition on Isotropic Forming Properties of Selective Laser Melting' (Chinese Journal of Lasers, 2018, 045(012):135-141), where the effect of the C, Si element on anisotropy is reported. A composition of Hastelloy-X alloy is reported by Yongzhi Zhang et al. in 'Microstructure and Anisotropy of the Tensile Properties of Hastelloy X Alloy by Laser Selective Melting' (Journal of Aeronautical Materials, 2018, 038(006):50-56), and compared with the anisotropy of the forge pieces. The effect of the different C, Si element on the strength of anisotropy under the condition of additive manufacturing process is reported by Jiaqi Xue in 'Effect of GH3536 Alloy Structure by Selective Laser Melting on Mechanical Properties' (Laser & Optoelectronics Progress, 2019, 56(14)), which reveals the effect of C element is significant and the effect of Si element is not significant. In addition, there are a number of patents related to nickel-based alloys, which can reduce the crack density and improve the crack susceptibility by controlling the composition of element. The patent document with publication number of CN105828983A discloses a nickel-based alloy that can reduce the crack density. The patent document with publication number of CN106513660A discloses a composition of nickel-based alloy, where the high temperature tensile plasticity can be improved and the crack susceptibility can be reduced by controlling the content of various elements: 20.5-23.0 Cr, 17.0-20.0 Fe, 8.0-10.0 Mo, 0.50-2.50 Co, 0.20-1.00 W, 0.04-0.10 C, 0-0.5 Si, 0-0.5 Mn, 0-0.008 B, and the content ratio of the elements C/B>5. The patent document with publication number of US20180073106A discloses that the tendency of cracking can be reduced without the expense of strength by determining 8.0-8.5 Cr, 9.0-9.5 Co, 0.4-0.6 Mo, 9.3-9.7 W, 2.9-3.6 Ta, 4.9-5.6 Al, 0.2-1.0 Ti, and other elements. The patent document with publication number of CN107486555A discloses a nickel-based alloy with C/Hf>1.55, 0.01%<C<0.2%, which can reduce the crack susceptibility.

The present disclosure further studies the composition of forming powder and tensile anisotropy to further optimize and reduce the tensile anisotropy of the nickel-based alloy formed by additive manufacturing, and provides a forming powder for a forming part by additive manufacturing with a low tensile anisotropy. The forming powder is composed of the following chemical components in terms of mass percentage (wt-%):

0.03% ≤ C ≤ 0.09%, 20.50% ≤ Cr ≤ 23.00%, 0.50% ≤ Co ≤ 2.50%, 8.00% ≤ Mo ≤ 10.00%, 0.20% ≤ W ≤ 1.00%, 17.00% ≤ Fe ≤ 20.00%, 0%<B<0.001%, 0% ≤ Mn ≤ 1.00%, 0% ≤ Si ≤ 0.15%, 0% ≤ O ≤ 0.02%, 0% ≤ N ≤ 0.015%, the rest are Ni and inevitable impurities.

In the prior art, the effect of the content of carbon and silicon in the forming powder on the properties of the forming part has already been known, wherein as disclosed in the background art literature, the carbon content has a significant effect on the number of intragranular carbides and carbides at the grain boundaries, and the carbides at the grain boundaries has a more significant inhibiting effect on the growth of grain size. Adding silicon will lead to the formation of more crack sources, resulting in a decrease in tensile strength. Boron plays an important role in the mechanical properties of nickel-based superalloys, so nickel-based alloys generally contain a trace amount of boron. Adding boron can improve the high temperature mechanical properties, the grain boundary shape and the processing properties of the alloy. In terms of the strengthening mechanism of boron, a theoretical study believes that boron can enrich the recrystallization boundary, fill the vacancies of the material and the lattice defects, reducing the diffusion process of the grain boundary and the speed of dislocation climbing, thereby improving the strength of the alloy. Another study holds that boron on the grain boundary can inhibit the early aggregation of carbides, thereby delaying the formation of cracks at the grain boundary. However, if too much boron is added, borides can be easily formed at the grain boundaries, which may reduce the mechanical properties.

Although the effect of carbon, silicon and boron content in the forming powder on the mechanism of the crack initiation on the forming part and the tensile strength of the part has been discussed in the prior art, there is a lack of research on the chemical element that plays an important role in tensile anisotropy in the prior art.

The forming powder for the nickel-based alloy of the invention is further optimized by the composition content of the chemical elements that play an important role in tensile anisotropy, and in terms of mass percentage, it is determined that 0.03% ≤ C ≤ 0.09%, 0% ≤ Si ≤ 0.15%, 0%<B<0.001%, when the mass percentages of carbon, silicon and baron are controlled to be in the above ranges respectively, the part formed by additive manufacturing with the powder mentioned above has a low tensile anisotropy.

It can be understood that the tensile anisotropy mentioned herein refers to the anisotropy of the tensile properties of the forming part at room temperature, which is not directly related to the strength of the tensile properties of the part. It is the difference in the results of the longitudinal and transverse tensile test of the part, where the longitudinal direction is the same as the forming direction of the part and the transverse direction is perpendicular to the forming direction.

Further, in a preferred embodiment, in terms of mass percentage, the carbon content is: 0.05%⩽ C⩽ 0.09%, the part formed by additive manufacturing with the powder mentioned above has a relatively lower tensile anisotropy.

Further, in a preferred embodiment, in terms of mass percentage, the silicon content is: 0.03%⩽ Si⩽ 0.1%, the part formed by additive manufacturing with the powder mentioned above has a relatively lower tensile anisotropy.

Further, in a preferred embodiment, in terms of mass percentage, both carbon content of 0.05%⩽ C⩽ 0.09% and silicon content of 0.03%⩽ Si⩽ 0.1% are further satisfied by the element content of the forming powder, so as to further reduce the tensile anisotropy of the part formed by additive manufacturing with the powder mentioned above.

In one or more embodiment of the nickel-based alloying powder, the nickel-based alloying powder is obtained by gas atomization or rotary electrode atomization, so as to ensure that spherical powder with smooth surface can be obtained. In other embodiments, the nickel-based alloying powder can also be obtained by other suitable methods.

In one or more embodiment of the nickel-based alloying powder, the powder particle size of the nickel-based alloying powder is from 15 μm to 150 μm. In some embodiments, different ranges of particle size are selected based on different types of additive manufacturing processes.

Another aspect of the invention is to provide a method for forming a forming part with a low tensile anisotropy, where the forming part with a low tensile anisotropy is formed by additive manufacturing process with the nickel-based alloying powder according to one or more embodiment mentioned above.

In one embodiment of the forming method, the additive manufacturing process is a selective laser melting process (SLM). In some different embodiment, the additive manufacturing process can also be a laser melting deposition process (LMD).

In one embodiment of the forming method, the forming part formed by additive manufacturing is a blank part, and the forming method further comprises performing stress relief annealing treatment on the forming part to further reduce the tensile anisotropy.

In one embodiment of the forming method, the forming method further comprises performing wire cutting process on the forming part after performing the stress relief annealing treatment on the forming part to remove burrs on the surface of the part, further improving the forming quality of the outer surface of the part.

In one embodiment of the forming method, the forming method further comprises performing hot isostatic pressing process on the forming part after performing the wire cutting processing on the forming part to further reduce the transverse organizational differences and the longitudinal organizational differences of the part, thereby reducing the tensile anisotropy.

Another aspect of the invention is to provide a forming part with a low tensile anisotropy, which is formed by the forming method according to one or more embodiment mentioned above The part with a low tensile anisotropy formed by the nickel-based alloying powder is further described in the following embodiment.

An embodiment:

In this embodiment, 4 examples and contrast examples 1-4 are provided, wherein the present nickel-based alloying powder is used in the embodiments 1-4, the nickel-based alloying powder according to one or more preferred embodiments is used in the embodiment 1-2. The mass percentage of boron and silicon in the contrast example 1, the mass percentage of boron in the contrast example 2, the mass percentage of carbon in the contrast example 3, the mass percentage of boron and silicon in the contrast example 4 and the mass percentage of silicon in the contrast example 5 are out of the range of the element range according to the invention respectively.

Table 1 shows the chemical element composition of the examples 1-4 and the contrast examples 1-5 (in terms of mass percentage):

TABLE 1

| Element | Example 1 | Example 2 | Example 3 | Example 4 | Contrast example 1 | Contrast example 2 | Contrast example 3 | Contrast example 4 | Contrast example 5 |
|---|---|---|---|---|---|---|---|---|---|
| C | 0.075 | 0.057 | 0.065 | 0.060 | 0.069 | 0.082 | 0.120 | 0.050 | 0.073 |
| Cr | 21.61 | 21.70 | 21.60 | 21.33 | 21.46 | 21.55 | 21.72 | 21.35 | 21.54 |
| Co | 1.53 | 1.53 | 1.53 | 1.58 | 1.51 | 1.64 | 1.45 | 1.58 | 1.65 |
| Mo | 9.03 | 9.10 | 8.96 | 9.10 | 8.64 | 9.11 | 8.85 | 9.15 | 9.15 |
| W | 0.59 | 0.80 | 0.65 | 0.70 | 0.53 | 0.62 | 0.58 | 0.62 | 0.57 |
| Fe | 18.53 | 18.60 | 18.66 | 18.69 | 19.35 | 18.53 | 18.51 | 18.57 | 19.97 |
| B | <0.001 | 0.0007 | 0.0007 | 0.0008 | 0.0011 | 0.003 | <0.001 | <0.002 | 0.0006 |
| Mn | 0.042 | 0.012 | 0.033 | 0.011 | 0.018 | 0.014 | 0.012 | 0.006 | 0.016 |
| Si | 0.08 | 0.033 | 0.12 | 0.12 | 0.300 | 0.075 | 0.059 | 0.370 | 0.28 |
| O | 0.014 | 0.009 | 0.008 | 0.010 | 0.018 | 0.02 | 0.0100 | 0.02 | 0.007 |
| N | 0.005 | 0.009 | 0.006 | 0.006 | 0.013 | 0.01 | 0.0060 | 0.01 | 0.006 |
| Ni | The rest | The rest | The rest | The rest | The rest | The rest | The rest | The rest | The rest |

Selective laser melting process is performed on the powder of the above examples 1-4 and contrast examples 1-5 using the EOS M280 device for formation. The forming parameters are: layer thickness of 20 μm, laser scanning rate of 180 W and rotation angle of 67° between layers (which can prevent the generation of transverse anisotropy). A longitudinal specimen 1 and a transverse specimen 2 as shown in FIG. 1 is formed according to the examples 1-4 and the contrast examples 1-5, wherein both the longitudinal specimen 1 and the transverse specimen 2 are formed along a forming direction a.

Figure 2:
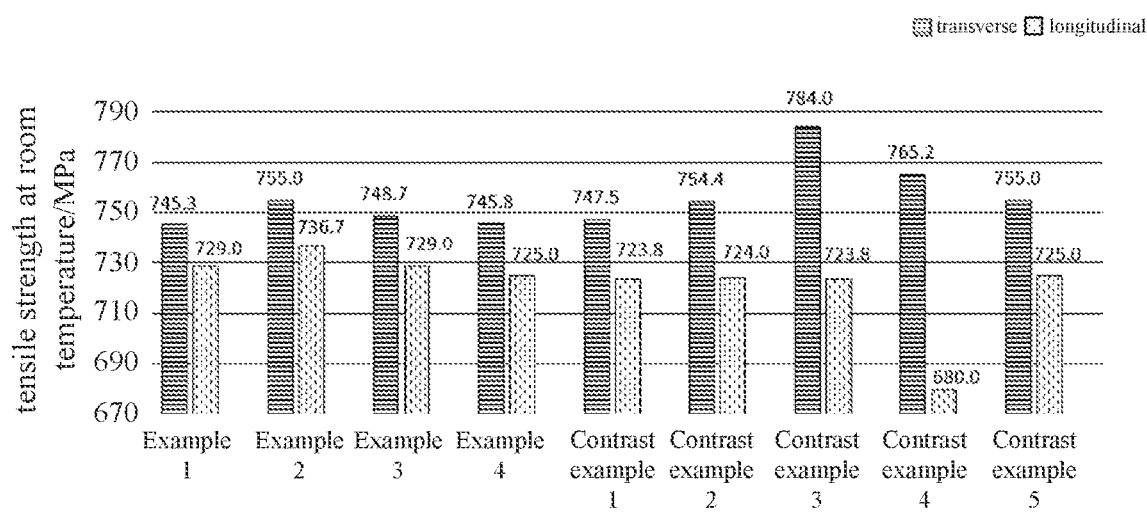
FIG. 2 shows the comparison diagram of the transverse and longitudinal tensile strength of the examples and the contrast examples 1-5 at room temperature.
Figure 3:
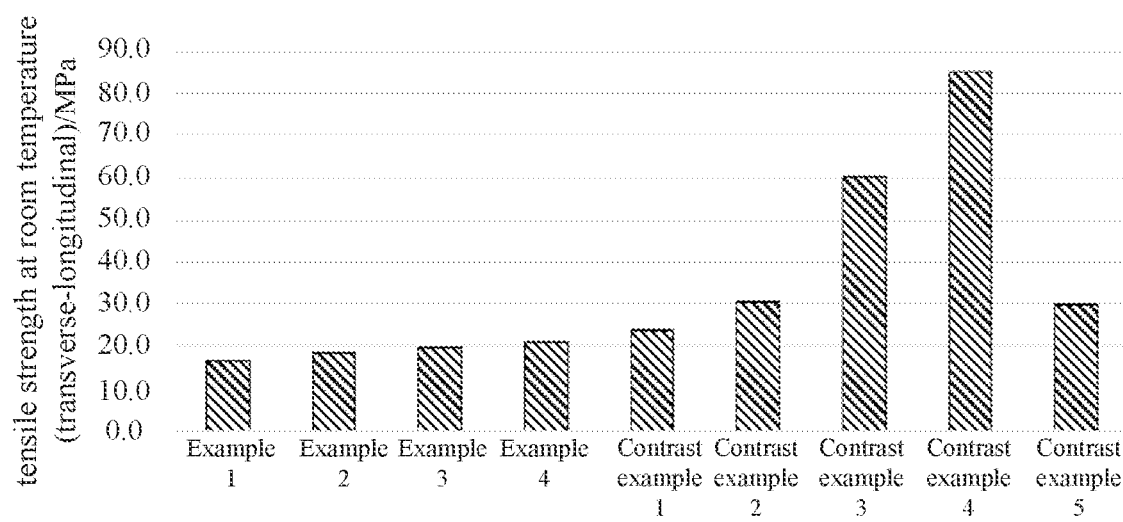
FIG. 3 shows the comparison diagram of the difference between the transverse tensile strength and the longitudinal tensile strength according to the measured values in FIG. 2.

Postprocessing is performed after the forming process has been completed, the steps of stress relief annealing treatment, wire cutting process and hot isostatic pressing process are performed in sequence, and the tensile test at room temperature is performed according to the standard. Specifically, the tensile test is performed on the longitudinal specimen 1 along a first direction y that is the same as the forming direction a, and the tensile test is performed on the transverse specimen 2 along a second direction x that is perpendicular to the forming direction a. FIG. 2 shows the comparison of the transverse and longitudinal tensile strength of the examples 1-4 and the contrast examples 1-5 at room temperature. FIG. 3 is the difference between the transverse tensile strength and the longitudinal tensile strength according to the measured values in FIG. 2.

Specifically, it can be seen from FIG. 2 and FIG. 3 that the example 1 of the forming part formed by the forming powder provided by the invention has a transverse tensile strength of 745.3 MPa (which is an average value of 3 sets of results) and a longitudinal tensile strength of 729.0 MPa (which is an average value of 3 sets of results) at room temperature, and the difference between the transverse tensile strength and the longitudinal tensile strength is 16.3 MPa.

The example 2 has a transverse tensile strength of 755.0 MPa (which is an average value of 3 sets of results) and a longitudinal tensile strength of 736.7 MPa (which is an average value of 3 sets of results) at room temperature, and the difference between the transverse tensile strength and the longitudinal tensile strength is 18.3 MPa.

The example 3 has a transverse tensile strength of 748.7 MPa (which is an average value of 3 sets of results) and a longitudinal tensile strength of 729.0 MPa (which is an average value of 3 sets of results) at room temperature, and the difference between the transverse tensile strength and the longitudinal tensile strength is 19.7 MPa.

The example 4 has a transverse tensile strength of 745.8 MPa (which is an average value of 3 sets of results) and a longitudinal tensile strength of 725.0 MPa (which is an average value of 3 sets of results) at room temperature, and the difference between the transverse tensile strength and the longitudinal tensile strength is 20.8 MPa.

The contrast example 1 has a transverse tensile strength of 747.5 MPa (which is an average value of 3 sets of results) and a longitudinal tensile strength of 723.8 MPa (which is an average value of 3 sets of results) at room temperature, and the difference between the transverse tensile strength and the longitudinal tensile strength is 23.7 MPa.

The contrast example 2 has a transverse tensile strength of 754.4 MPa (which is an average value of 3 sets of results) and a longitudinal tensile strength of 724.0 MPa (which is an average value of 3 sets of results) at room temperature, and the difference between the transverse tensile strength and the longitudinal tensile strength is 30.4 MPa.

The contrast example 3 has a transverse tensile strength of 784.0 MPa (which is an average value of 3 sets of results) and a longitudinal tensile strength of 723.8 MPa (which is an average value of 3 sets of results) at room temperature, and the difference between the transverse tensile strength and the longitudinal tensile strength is 60.2 MPa.

The contrast example 4 has a transverse tensile strength of 765.2 MPa (which is an average value of 3 sets of results) and a longitudinal tensile strength of 680.0 MPa (which is an average value of 3 sets of results) at room temperature, and the difference between the transverse tensile strength and the longitudinal tensile strength is 85.2 MPa.

The contrast example 5 has a transverse tensile strength of 755.0 MPa (which is an average value of 3 sets of results) and a longitudinal tensile strength of 725.0 MPa (which is an average value of 3 sets of results) at room temperature, and the difference between the transverse tensile strength and the longitudinal tensile strength is 25 MPa.

It can be seen from the above comparison that for the forming part formed by the forming powder provided by the invention, the difference between the transverse tensile strength and the longitudinal tensile strength at room temperature is reduced significantly, and the tensile anisotropy at room temperature is reduced significantly, particularly suitable for manufacturing a part where the direction of the force applied does not have an obvious directionality.

Although the present invention is disclosed above with the preferred embodiments, it is not intended to limit the invention, and any person skilled in the art can make possible changes and modifications without departing from the spirit and scope of the invention. Therefore, any modifications, equivalent changes and alternatives made to the above embodiments according to the technical essence of the invention without departing from the content of the technical solutions of the invention shall all fall within the scope of protection defined by the claims of the invention.

The invention claimed is:

1. A forming part with tensile anisotropy no more than 20.8 MPa, wherein:
   the tensile anisotropy is the difference in results of longitudinal and transverse tensile test of the part, where the longitudinal direction is the same as forming direction of the part and the transverse direction is perpendicular to the forming direction;
   the forming part is formed by an additive manufacturing process, and a forming powder used for the additive manufacturing process is composed of the following chemical components in terms of mass percentage (wt-%):
   $0.03\% \leq C \leq 0.09\%$, $20.50\% \leq Cr \leq 23.00\%$, $0.50\% \leq Co \leq 2.50\%$, $8.00\% \leq Mo \leq 10.00\%$, $0.20\% \leq W \leq 1.00\%$, $17.00\% \leq Fe \leq 20.00\%$, $0\% < B < 0.001\%$, $0\% \leq Mn \leq 1.00\%$, $0\% \leq Si \leq 0.15\%$, $0\% \leq O \leq 0.02\%$, $0\% \leq N \leq 0.015\%$, and the rest are Ni and inevitable impurities.

2. The forming part according to claim 1, wherein in terms of mass percentage (wt-%) of the chemical components of the forming powder, the carbon content is: $0.05\% \leq C \leq 0.09\%$.

3. The forming part according to claim 1, wherein in terms of mass percentage (wt-%) of the chemical components of the forming powder, the silicon content is: $0.03\% \leq Si \leq 0.1\%$.

4. The forming part according to claim 1, wherein the forming powder is obtained by gas atomization or rotary electrode atomization.

5. The forming part according to claim 1, wherein particle size of the forming powder is from 15 μm to 150 μm.

6. The forming part according to claim 1, wherein the additive manufacturing process is a selective laser melting process.

* * * * *